United States Patent
Ellwanger

[15] 3,686,801
[45] Aug. 29, 1972

[54] AUTOMATIC SERVER FOR MACHINE FOR RUNNING PAIRS OF GEARS TOGETHER

[72] Inventor: Charles G. Ellwanger, Rochester, N.Y.

[73] Assignee: The Gleason Works, Rochester, N.Y.

[22] Filed: Dec. 16, 1970

[21] Appl. No.: 98,536

[52] U.S. Cl. .................................. 51/215 R, 209/75
[51] Int. Cl. ....................................... B24b 47/02
[58] Field of Search.....51/215 R; 209/80, 75; 73/162

[56] References Cited

UNITED STATES PATENTS

| | | | |
|---|---|---|---|
| 2,965,971 | 12/1960 | Pomernacki | 209/80 UX |
| 3,502,208 | 3/1970 | Muller | 209/80 X |

*Primary Examiner*—Othell M. Simpson
*Attorney*—Morton A. Polster

[57] ABSTRACT

For a machine for running pairs of gears together, e.g., for lapping or testing one pair at a time, there is provided an incoming magazine, an outgoing magazine, a conveyor device which moves gear pairs toward the front of the incoming magazine; a conveyor device which moves gear pairs toward the back of the outgoing magazine; a transfer device which moves two pairs of gears across the machine at once: taking one pair from the machine's work station and another from the front of the incoming magazine and shifting these pairs, respectively, to the front of the outgoing magazine (or to a reject chute) and the machine's work station. The gears are oriented in the incoming magazine so they will mesh when mounted at the work station. The server is responsive to tests performed at the work station to reject and replace any damaged or improperly paired gears or any gear pair improperly installed at the work station and to indicate the reaons for rejection on a register which shifts as additional pairs are rejected so the machine operator can quickly discern which gear pair was rejected for which reason. A telescoping cover encloses the work station during the lapping operation to prevent contamination of the transfer mechanism.

25 Claims, 22 Drawing Figures

CHARLES G. ELLWANGER
INVENTOR.

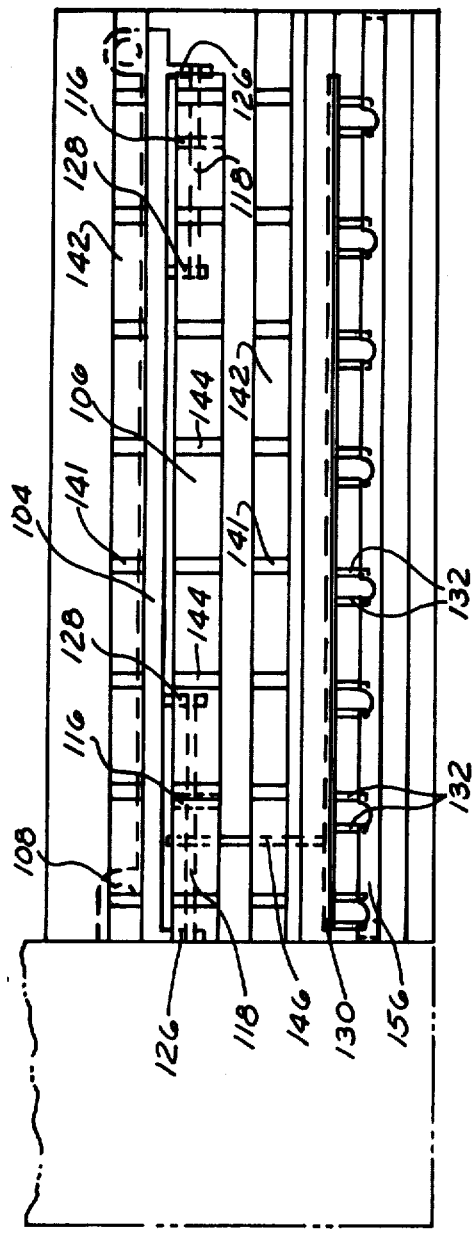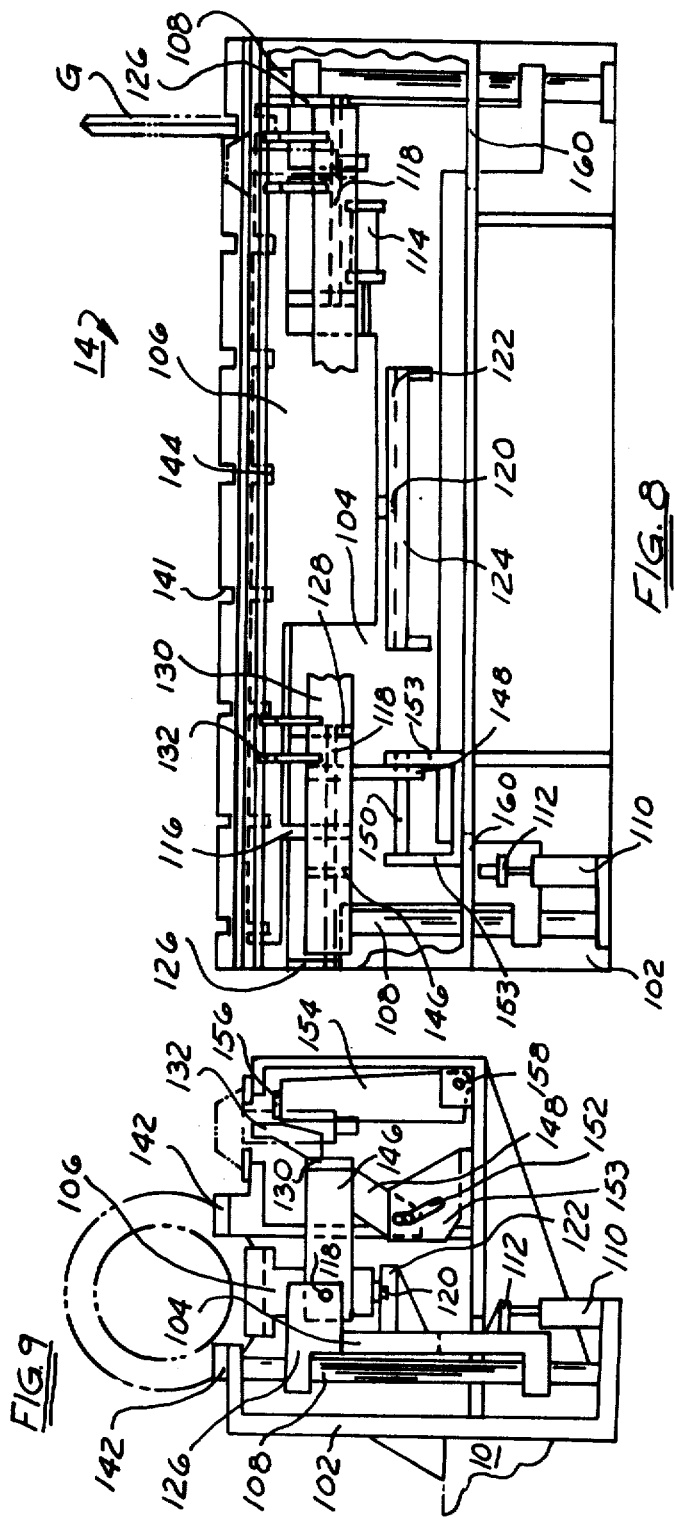

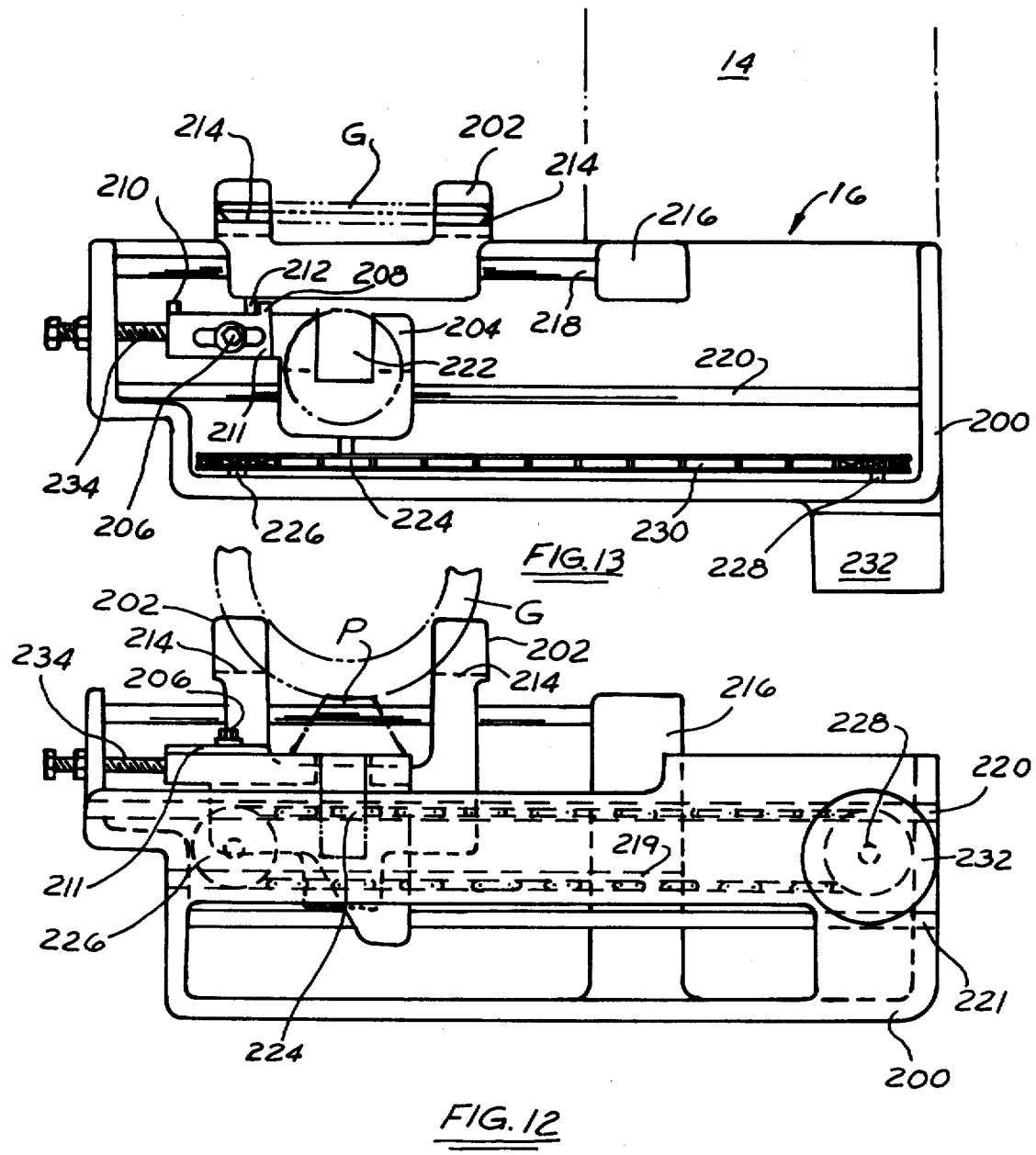

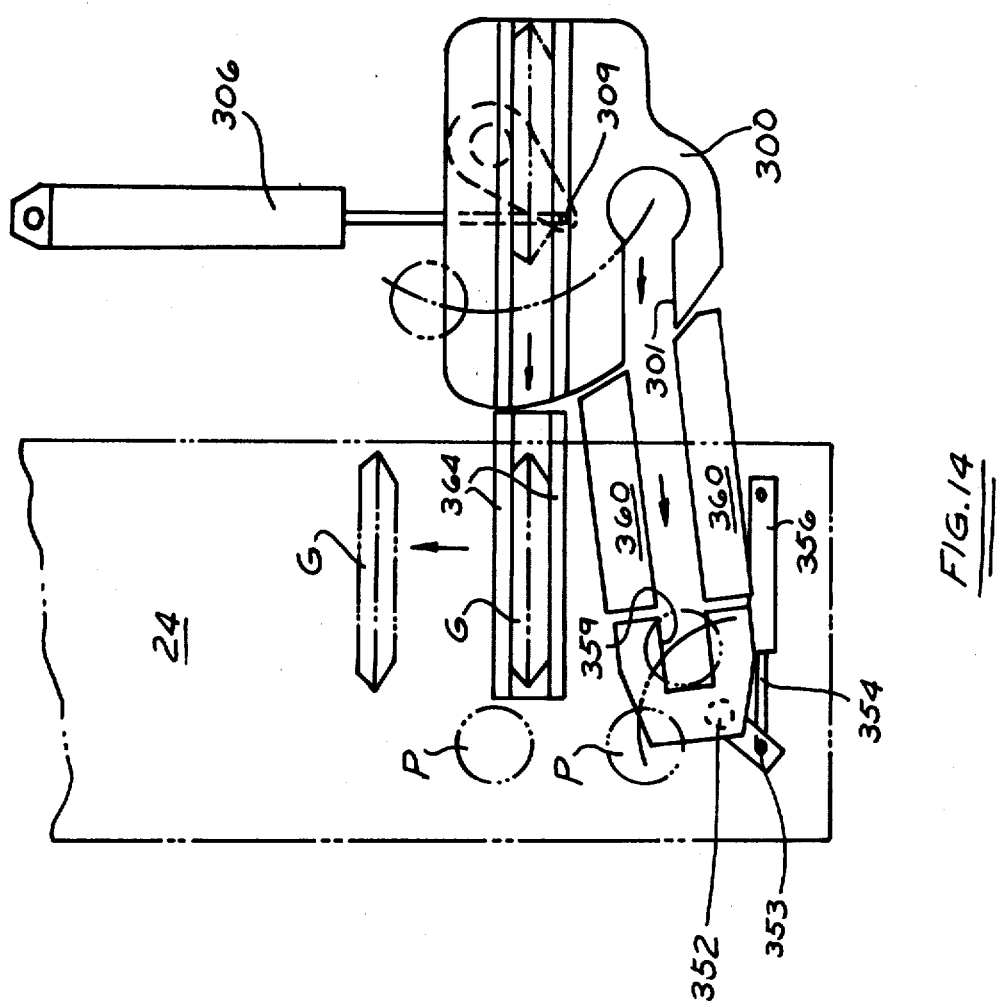

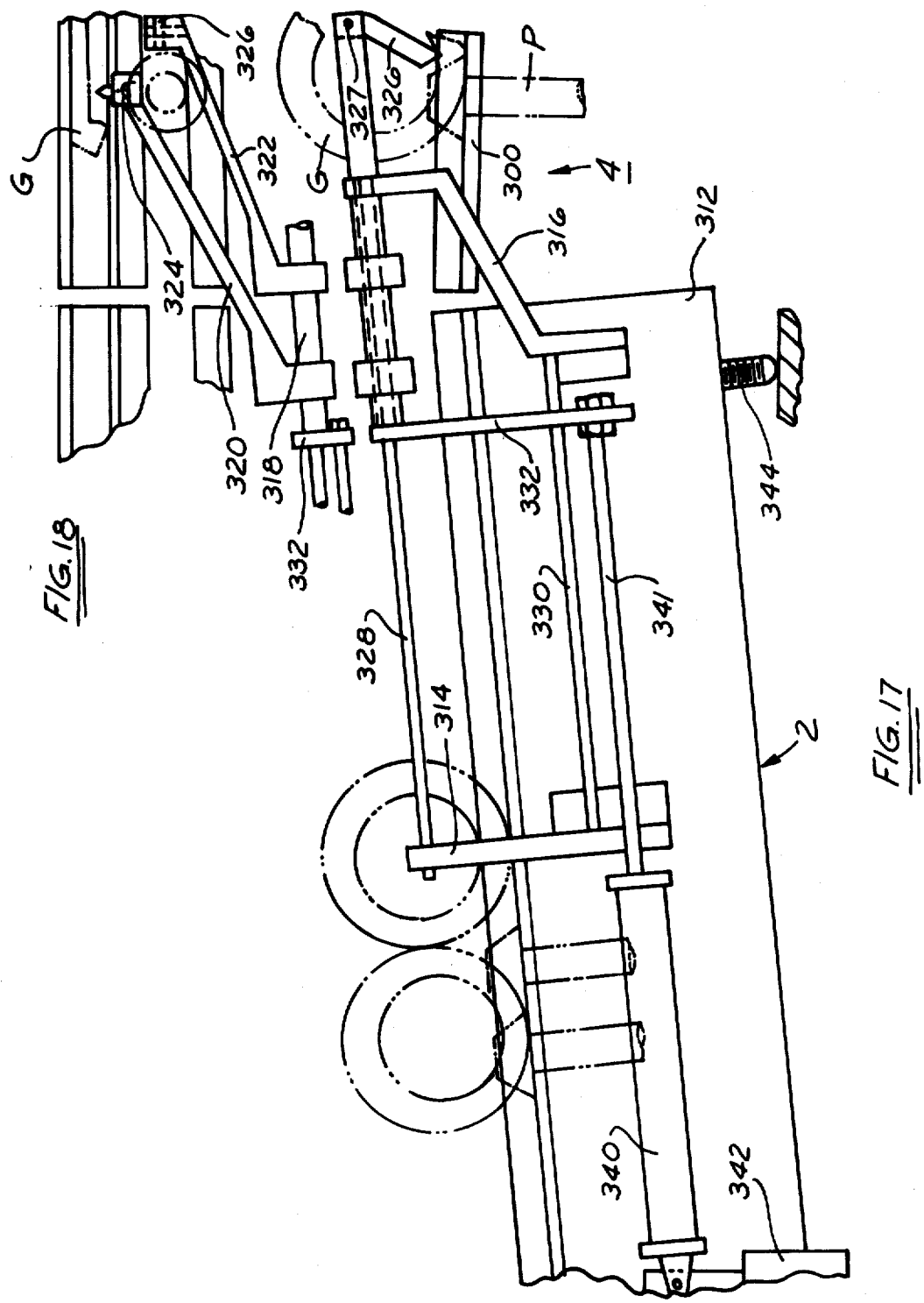

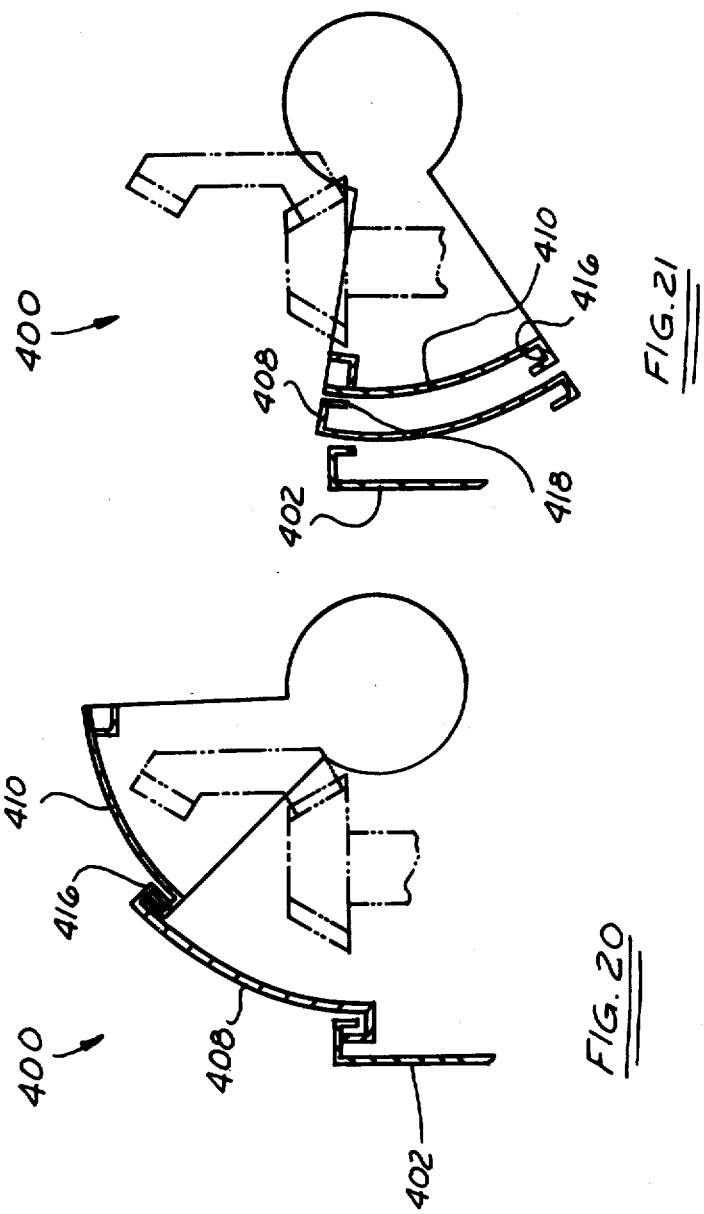

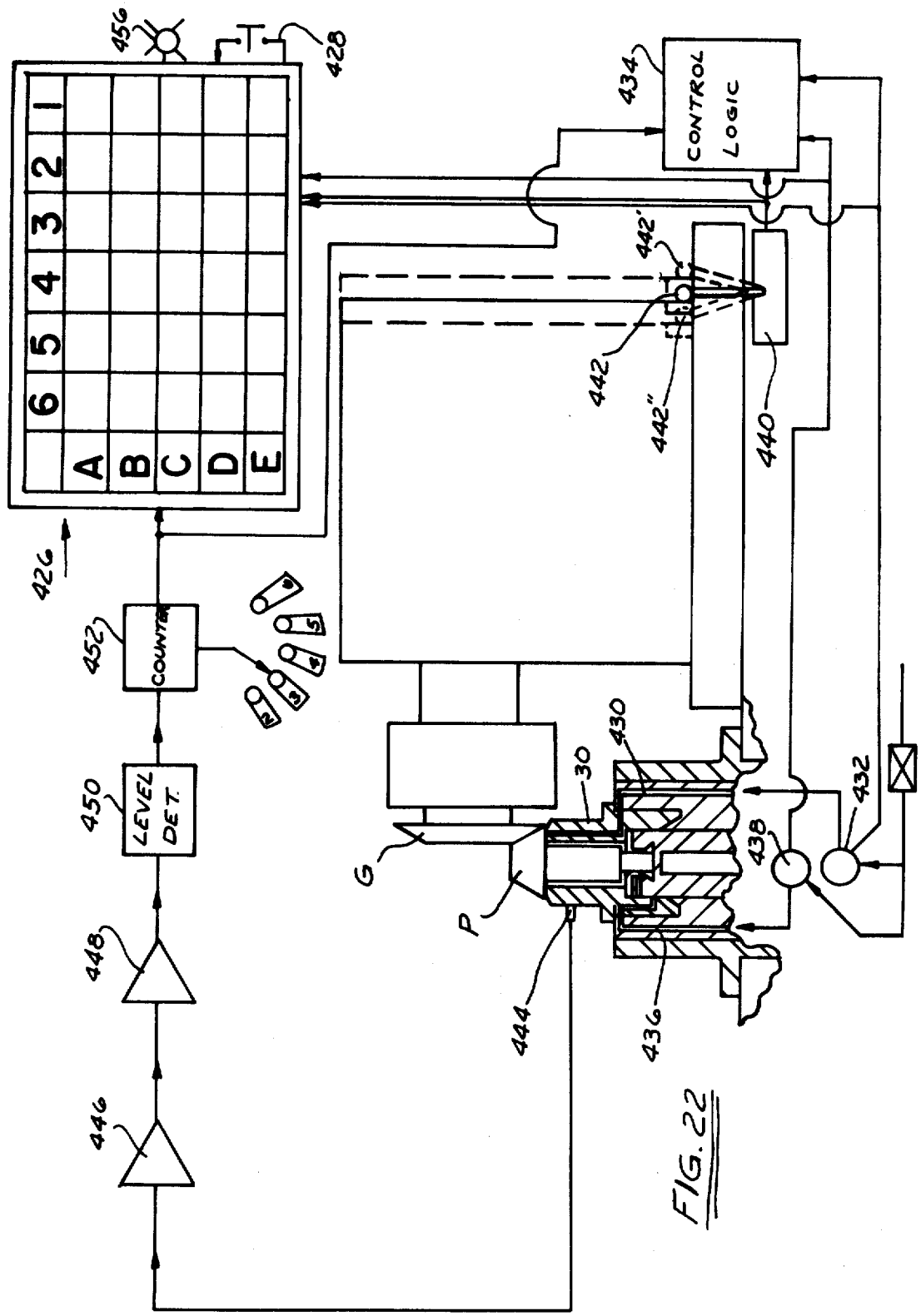

AUTOMATIC SERVER FOR MACHINE FOR RUNNING PAIRS OF GEARS TOGETHER

BACKGROUND OF THE INVENTION

Bevel and hypoid gear lapping machines run pairs of gears together in mesh at a work station while a fine-abrasive lapping compound is sprayed onto the meshing gear teeth, and the gears are translated relative to one another along three axes to traverse the tooth contact area back and forth along the length of the gear teeth. This is done after heat treatment to refine surface finish and tooth bearing characteristics of the pair in order to ensure quiet running and efficient power transmission once the pair of gears is mounted in a product, e.g., an automotive power train differential. Similar machines, without means for applying lapping compound, are used for testing pairs of gears.

Co-pending U.S. Pat. application Ser. No. 98,512, filed Dec. 16, 1970, discloses a machine for lapping a bevel or hypoid gear mounted on a horizontal spindle in mesh with a corresponding pinion mounted on a vertical spindle. The server disclosed in this application was specially designed to serve such a machine. However, with minor modifications which do not result in departure from the principles of the disclosed invention, the server can be used as well with other machines for running pairs of gears together.

Gear pairs normally are inspected for certain defects which make the gears unsuited for lapping. Defects such as gross errors in tooth size may require scrapping a part, while other smaller defects such as nicks and burrs can be remedied, especially if detected before lapping is done. These inspections are customarily done by the operator at the time he loads and starts the lapper. Therefore one problem which must be solved by apparatus for fully automating the lapping process is the provision of means for making such essential inspection and for rejecting unsuitable pairs before the lap cycle commences, such rejection of unsuitable parts preferably being done without shutting down the machine and halting the automatic flow of work through the machine.

Upon completion of the lapping operation, gear pairs are usually handled and stored in pairs as lapped. The reason for such procedure is that it is generally not possible to obtain optimum running qualities by interchanging lapped gears and pinions. Thus, a further problem in automating the lapping operation is to provide means for keeping the gears in pairs upon discharge from the work station.

Lapping involves the use of a wet abrasive compound which contaminates the surrounding parts in the lapping chamber, and this compound will drip from any chamber structure located above the workholders following the lapping operation. Prior art lapping operations require the presence of an operator to wipe workholding chucks following each lapping operation to assure that the work-seating surfaces of the chucks are not contaminated with the abrasive compound. This contamination problem has heretofore been a factor militating against automation of lapping machine loading.

An automatic conveyor, loader and transfer apparatus serving gear cutting machinery is depicted in U.S. Pat. Nos. 3,169,446 and 3,541,921. Preferably the jaws of the transfer mechanisms of the device of the present invention are configured and coact substantially as described in these two patents.

SUMMARY OF THE INVENTION

The novel automatic server disclosed herein incorporates all of the necessary facilities for automating work handling in a machine for running pairs of gears together for lapping or testing one pair at a time. In the described embodiment, an incoming magazine is provided for storing and advancing gear pair sequentially to a convenient position relative to a bevel and hypoid gear lapping machine. A means is provided for moving each pair in turn from this position in the incoming magazine to a station from which the set is transferred to a work station.

A transfer device including both loading and unloading jaws, operates across the front of the machine for effecting the transferral of successive pairs into and out of the work station. At the work station and before being lapped, a gear pair is subjected to several preliminary tests, namely, (1) a check for proper seating and clamping by the workholders, (2) a check for oversize or undersize teeth and (3) a nick and burr detection.

If the gear pair fails one of the named tests, it is immediately removed from the work station and transferred to a temporary holding station in the form of a "reject turntable." Simultaneously the transfer device moves the next succeeding pair into the work station. The defective pair is automatically moved from the reject turntable into a reject chute and, upon arrival at the reject chute, a monitoring system of the "shift register" type indicates the reason for the rejection of the set. This system continues to identify in its display means the reason for rejection of each pair held within the reject chute.

If, alternatively, a set passes the preliminary tests and subsequent lapping operations are performed, the lapped pair is then withdrawn from the work holder by the same transfer device and transferred to the same holding station, i.e., the reject turntable. In this case the reject turntable will remain oriented such that on the next succeeding operation of the transfer device, the held lapped pair will be moved and arranged for acceptance by an outgoing magazine. The outgoing magazine operates similarly to the incoming magazine, storing and moving the lapped gears and pinions in pairs.

This automatic loading apparatus further solves the problem of aligning teeth and slots so that the pair will be in meshing relationship at the work station by orienting the pinion and gear, in the proper tooth-to-slot relationships, in the incoming magazine. Thus upon reaching the work station the gear and pinion are oriented in their proper tooth-mesh position.

As noted above, the preferred embodiment of the subject server is employed on a lapping machine having a horizontal gear spindle and a vertical pinion spindle, and such a machine preferably includes means for effecting axial movement of the gear spindle head of the machine such as is disclosed in the co-pending application, Ser. No. 98,512 referred to above. Such advance and withdraw motion of the gear head is used in the loading-unloading operation, bringing the workholder respectively into and out of engagement with the gear blank held by the transfer jaws. Therefore, by making use of this particular gear head movement, the preferred form of the invention saves a significant amount of additional loading apparatus mechanism that would otherwise be required to move the gear onto the arbor.

The automatic control of the loading-unloading apparatus is effected by a sequencer of the pneumatic type which is of high reliability and utilizes cams to actuate valves which in turn activate pressure switches. The controller and its cams are arranged such that the sequential motions of the loading-unloading mechanism may be readily modified if desired, thus making the system highly flexible.

In addition, the subject server is provided with a novel lapping chamber which comprises a telescoping cover for enclosing the work station during the lapping operation. This cover prevents contamination of the transfer mechanism by the lapping compound during the lapping operation and, since it is folded to a position below the work station after each lapping operation, excess compound remaining on the cover following lapping cannot drip onto or into the workholding and work-handling devices during loading and unloading operations. This novel cover solves a major part of the contamination problem, and substantially contamination-free operation can be achieved when the subject server is used with machines which provide a final "spin-cleaning" of the gear pair after lapping and prior to opening of the cover. In this regard, it might be noted that the recently developed lapping machine referred to above includes such a spin-cleaning cycle in which the gear pair is disengaged, following lapping, and both gears are rotated at high speeds to spin them clean of compound just before the opening of the work station cover.

It will be appreciated that the entire loading arrangement and operation of the subject apparatus is designed to require no operator attendance other than for occasional tending of the incoming and outgoing magazines and the reject chute.

The principles and further advantages of the invention will be further hereinafter discussed with reference to the drawings wherein a preferred embodiment is shown. The specifics illustrated in the drawings are intended to exemplify, rather than limit, aspect of the invention as defined in the claims.

BRIEF DESCRIPTION OF THE DRAWINGS

In the drawings:

FIG. 8 is a side elevation view of the incoming magazine with parts broken away to expose interior details and certain parts eliminated for purposes of clarity;

FIG. 9 is a partial front end elevation view of the incoming magazine with certain parts omitted for clarity;

FIG. 10 is a top plan view of the incoming magazine shown in FIGS. 8 and 9, also indicating the position of the loading nest in block form;

FIGS. 12 and 13 are, respectively, a front elevation view and a top plan view of the loading nest;

FIG. 14 is a top plan view of the reject turntable, unload nest, and a portion of the outgoing magazine;

FIGS. 17 and 18 are, respectively, a side elevation and a partial top plan view of the reject chute mechanism;

FIGS. 20 and 21 are section views of the cover mechanism shown in FIG. 19, illustrating the cover in closed and open positions, respectively; and FIG. 22 is a schematic diagram of the reject system for monitoring pairs of gears which are considered unsuitable for lapping or testing for various reasons.

DETAILED DISCUSSION OF THE PREFERRED EMBODIMENT

Figure 1:
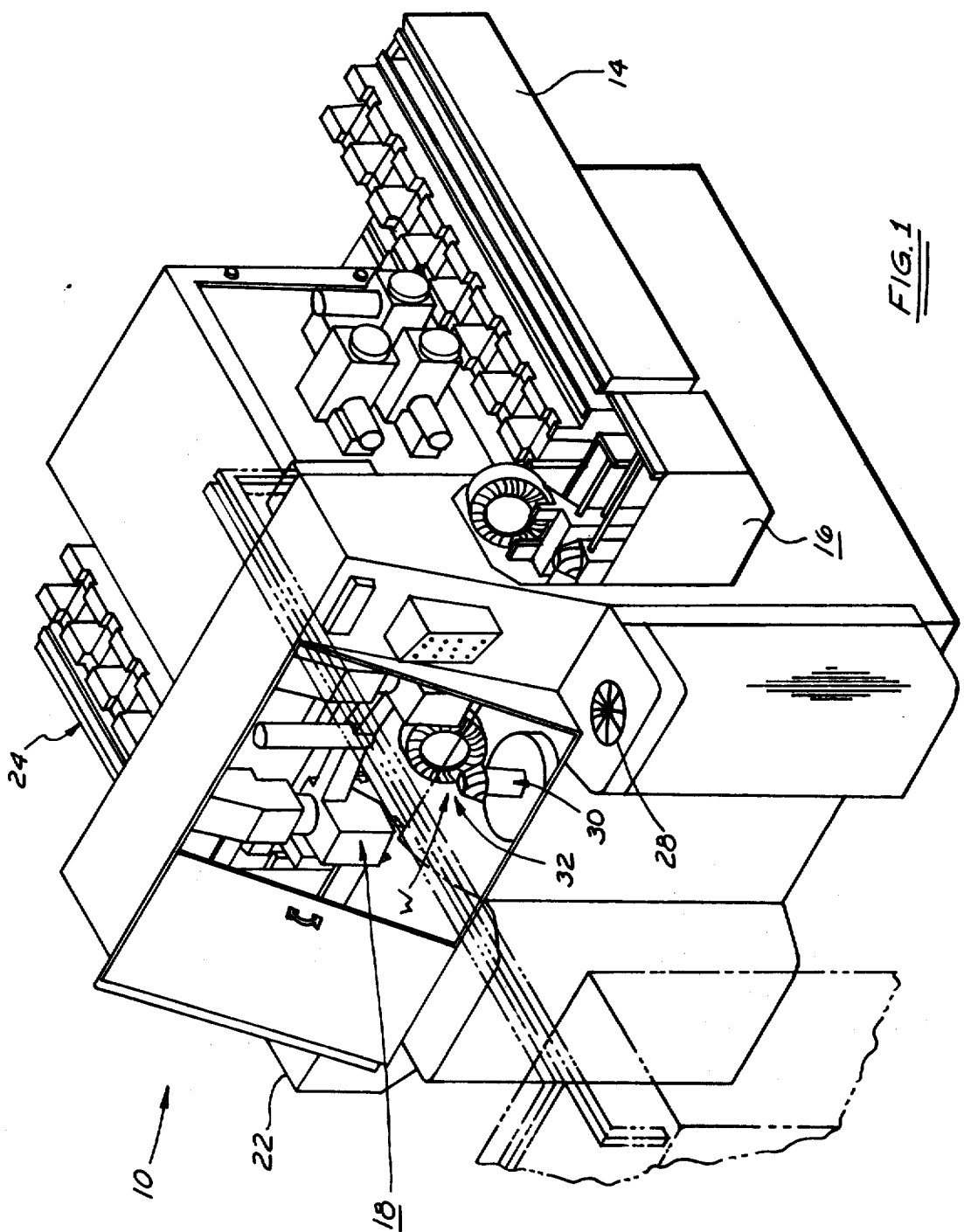
FIG. 1 is a perspective view of a machine for running a pair of gears together in mesh, e.g., for lapping, machine which is equipped with an automatic server constructed in accordance with the principles of the present invention.

A machine 10 for running a bevel or hypoid gear in mesh with a corresponding pinion and equipped with an automatic server is depicted in FIG. 1 from the front and toward the incoming magazine 14 of the automatic server. The automatic server 12 is shown schematically, by itself, from the same aspect in FIG. 2. Generally, the automatic server 12 includes an incoming magazine 14, a load nest 16, a transfer mechanism 18, an unload turntable 20, an unload next 22, an outgoing magazine 24, a reject chute 26, a program control drum 28 and attendant interconnecting elements.

Figure 2:
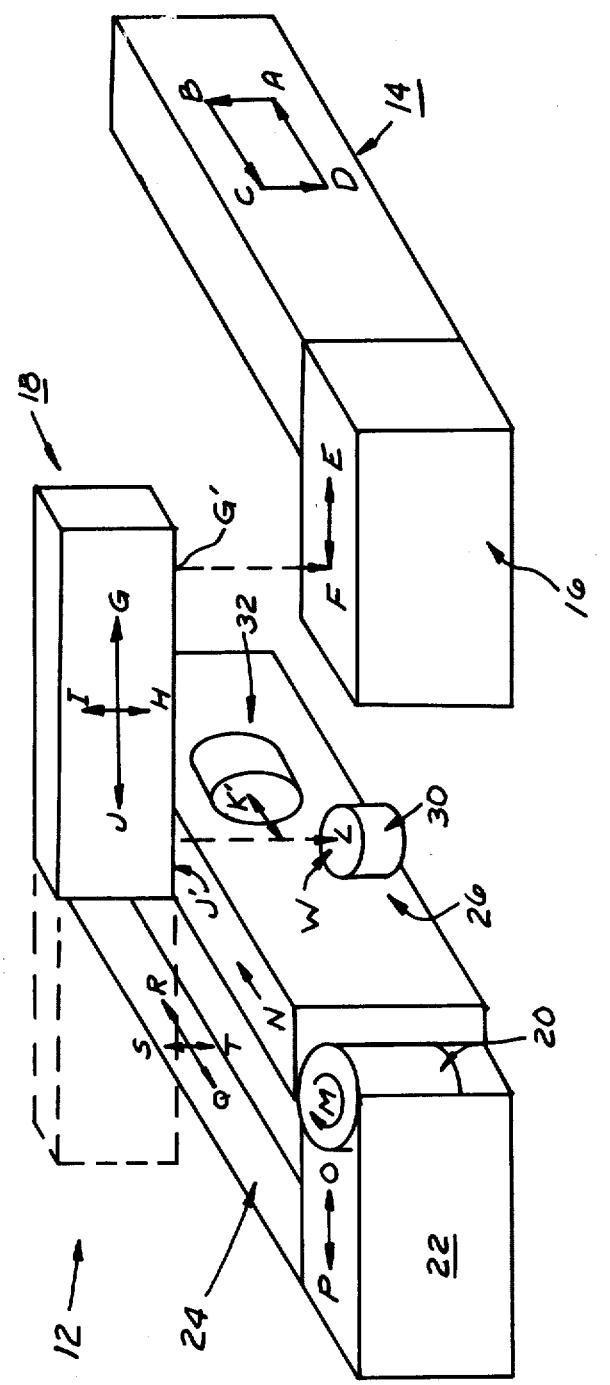
FIG. 2 is a schematic perspective view of the automatic server.

With reference to FIGS. 1 and 2, the movements by the automatic server of typical gear sets through the machine will now be succinctly outlined. Gear pairs, (i.e., sets) are manually placed into the incoming magazine 14. Once for each change of gear pair at the work station W, each gear pair on the incoming magazine is walked forward one step by being raised from A to B then advanced to C and lowered to D. (The walking mechanism resets to A.) For each gear pair, the walking continues until that gear pair has reached position E of the load nest 16. Once there, the gear pair is shifted to position F whereupon the transfer mechanism 18, which is shown in its G position lowers in direction H and its station G', comprising jaw mechanism later to be described, engages the gear set. The transfer mechanism 18 then raises to the I position. Upon reaching the I position, the transfer mechanism 18 shifts in the J direction. This places station G' directly over the W or work station position, and places station J' (comprising other similar jaw mechanisms later to be described) directly over the M position. Transfer mechanism 18 again lowers in the H direction, and deposits the pinion at position L in the pinion spindle 30. Also while the transfer mechanism 18 is in this position, gear head 32 advances to the K position and receives the gear. While the G' station is placing the gear and pinion in their respective work station chucking positions, station J' is in the M position, i.e., stations G' and J' are in the L and M positions their jaw mechanisms respectively disengaging a gear pair at each position. The transfer mechanism then moves upward to the I position and laterally to the G position. If the gear set which has been tested (prior to lapping) was found unacceptable, turntable 20 (position M) rotates in a clockwise direction and disposes the set for movement onto reject chute 26. Here the set is moved in the N direction. Conversely, if the set has been found acceptable and consequently has been lapped, the unload mechanism 22 shifts to the O position. From the O position the set moves in the P direction. Outgoing magazine 24 walking mechanism advances in the Q direction and raises in the S direction thus picking up the gear set from the unload nest. While in the S position, the outgoing magazine 24 moves the set a step in the R direction, then lowers in the T direction, placing the set in the first of a plurality of compartments in the outgoing magazine, later to be described.

Figure 3:
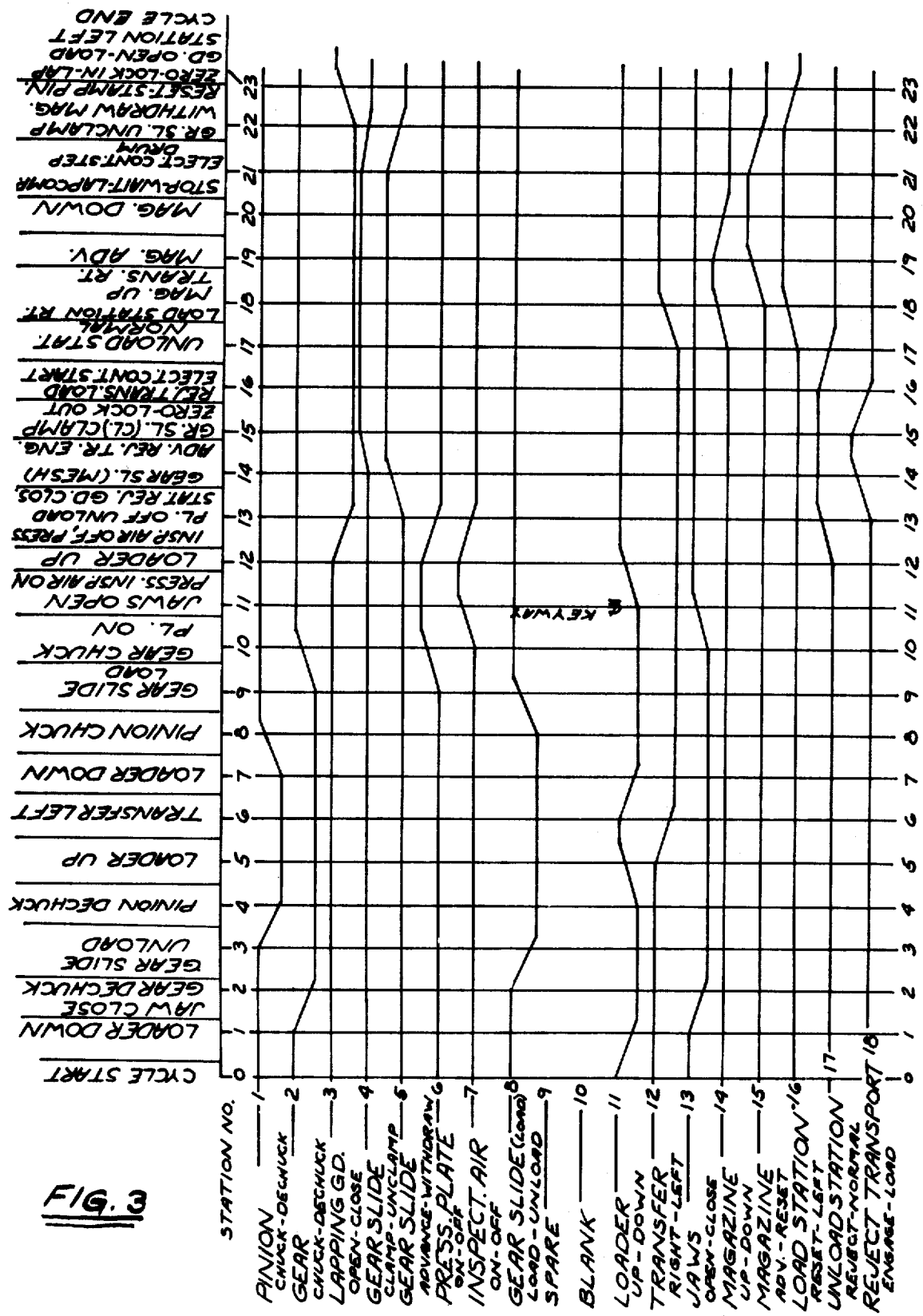
FIG. 3 is a schematic development of the cycle drum which controls operation of the automatic server.

Repetitive operations of the automatic server (as well as certain operations of the machine 10 which are not pertinent to the present discussion) are controlled by the program control drum 28 indicated in FIG. 1 and shown developed schematically in FIG. 3, wherein the various cams stacked to constitute the drum are listed along the vertical scale and the various steps in operation of the automatic server which take place as the program control drum rotates are listed along the horizontal scale. Thus, the curves in FIG. 3 represent the conditions of the respective switching means operated by the cams of the drum as the drum rotates. The control drum is driven in a stepwise manner by a motor actuated by a pressure switch responsive to air pressure indications of the position of the various machine elements. Such control drum systems are known, and one such prior art system is disclosed in detail in U.S. Pat. No. 3,521,524 assigned to the assignee hereof. In the preferred embodiment disclosed herein, the drum cams actuate air pilot valves which remotely control hydraulic valves. Other, equivalent switching means could be used.

Figure 4:
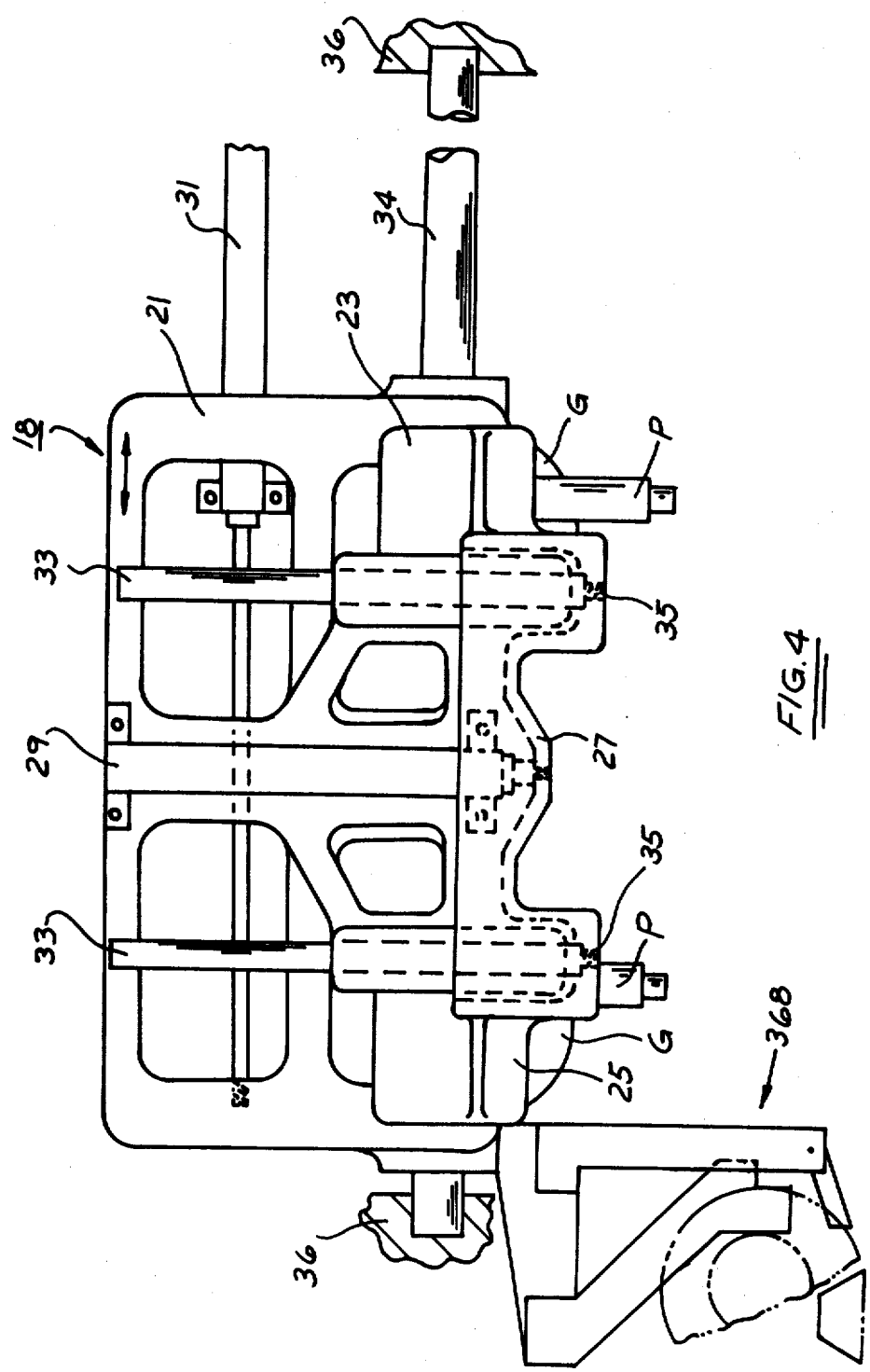
FIG. 4 is a front elevation view of the support and mounting of the gear pair transfer device, also showing the pusher arms for moving workpieces from the reject turntable to the unload rest.

The transfer device 18, which is visible through the open doors at the work station W in FIG. 1 is also shown in FIGS. 4-7. Referring first to FIG. 4, there is shown a rail 34 which extends transversely of the machine 10 adjacent the work station. The ends of the rail 34 are fixed in frame extensions 36 of the machine 10. The transfer device includes a bracket 21 slidably received about the rail 34. For moving the transfer device back and forth along the rail 34 there is provided a pressurizable, double acting piston and cylinder arrangement 31 which has one end connected to the bracket 21 and the other end to a frame extension of the machine 10. The bracket 21 includes two transversely spaced, vertically extending sleeves which respectively slidingly receive intermediate portions of shafts 33. The lower ends of the latter are threadably secured at 35 in upwardly open sockets in a carriage 27, providing for slidable vertical displacement of the carriage with respect to the bracket. The displacement is effected by means of a double acting piston and cylinder arrangement 29 which is vertically oriented, the cylinder being fixedly mounted to the bracket 21 and the piston having its lower end secured to carriage 27. The carriage is shown at its uppermost extreme in FIGS. 4 and 5. When the carriage is moved downwardly by pressurization of the double acting piston and cylinder arrangement 29 in a first sense, the shafts 33 act as guides. The jaw mechanisms for grasping two sets of gears are mounted on the back of the carriage 27. Accordingly, they are not visible in FIG. 4, although the gear sets, G and P at the left and G and P at the right, show in this FIG.

Figure 5:
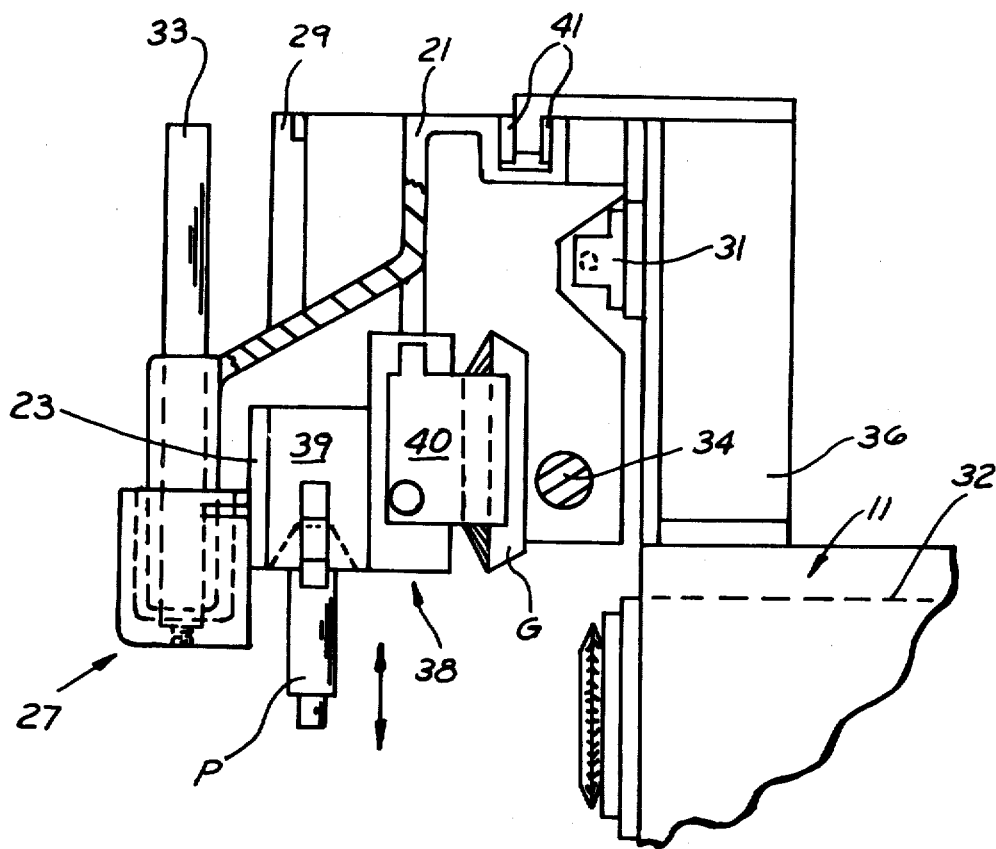
FIG. 5 is a side elevation view of a front portion of the transfer device of FIG. 3, showing the device in partial section.

However in FIG. 5, one of the pinion jaw mechanisms is depicted at 39 and one of the gear jaw mechanisms is depicted at 40. These mechanisms are respectively shown in more detail in FIGS. 6 and 7. The pinion jaw mechanism 39 and the gear jaw mechanism 40 of each transfer head are rigidly fixed on mounting pads 23 and 25, which are part of the movable carriage 27. Accordingly, pads 23 and 25 move in a downward or upward direction with the carriage 27. When the carriage 27 is at its lowermost position, two of four events may occur. Two are discussed here and two are discussed later.

1. The pinion P is in the pinion spindle 30 and chucked (or dechucked depending on the sequence) and the pinion jaws release the pinion.
2. The gear head 32 advances and its arbor engages and firmly chucks the gear G. The advance of the gear head is controlled by a piston and dashpot arrangement (not shown). The gear head is brought forward to a limit position such as to insure firm seating of the back face of the gear on the workholder. Thereafter, the gear G is firmly chucked in the gear head arbor, the gear head jaws release and the gear and pinion jaw mechanisms 39 and 40 are moved upwards.

When carriage 27 is in its uppermost position, the bracket 21 is moved from right to left or left to right (FIG. 4 orientation) depending on the sequence.

Bracket 21 is supported from rotation about the rail 34 by bearing 41 which slidingly receive a depending flange 42 of the frame extension 36.

Figure 6:
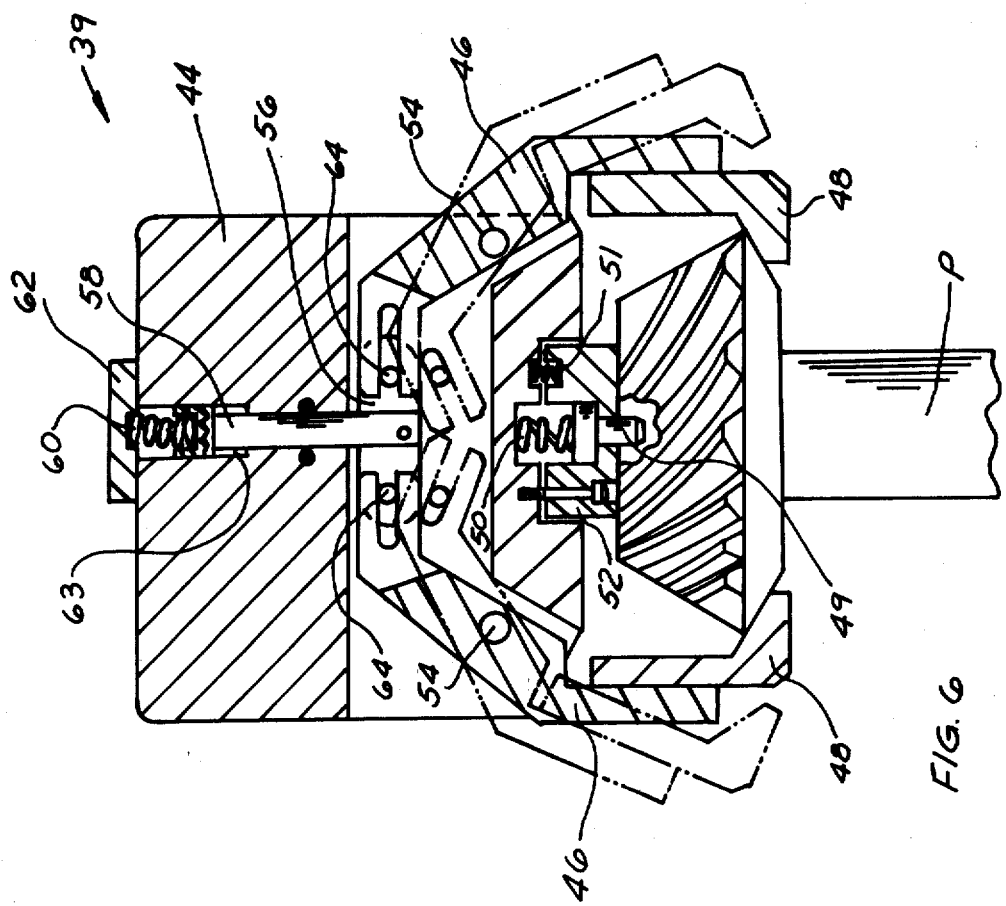
FIG. 6 is a longitudinal sectional view of one of the transfer device jaws for transferring pinions.

The structure and operation of the pinion jaw mechanism 39 can be seen most easily from FIG. 6.

As fluid pressure is introduced into chamfer 63, the piston 58 is caused to move in an upward direction, thereby compressing spring 60. (The piston is shown in uppermost position, i.e., a pinion is clamped in the pinion jaw mechanism jaws.) Upon upward movement of piston 58, the extensions 56 which is pin connected to piston 58 also moves upward. Attached to this extension are two dowel pins 64 which act as drives for jaw member 46. Jaw members 46 have attached to them two inserts 48 which are fixed for adjustment to members 46 and may be changed when the machine 10 is being readjusted to process different size pinions.

As the pinion jaw mechanism 39 is lowered to the top of the pinion, a centering pin 49, which passes through cushioning block 52, mates with a corresponding center and free fitting hole in the top of the pinion. Circular block 52, and springs 50 and 51 coact to provide a "cushioning" effect as member 39 is lowered to engage the pinion. Three springs 51 equiangularly located in the block 52 are compressed a small amount to tightly grip the pinion upon closing of the jaws. The block 52 is constrained and centered by a plurality of screws which are equiangularly spaced among the springs 51. Member 52 is slidable on the screws axially of the pinion and the axial movement is limited by the head of these screws, when jaws are opened.

Opening of the jaw members 46 is facilitated by exhausting hydraulic pressure from chamber 63 thereby causing spring 60 to return to its full height, causing piston 58 and extension 56 to move in a downward direction. Jaw members 46 pivot about pins 54 due to downward vertical movement of horizontal dowel pins 64 which are received in inwardly opening slots in the upper ends of the jaw members. The movement of the jaw members 46 is from the position shown in full lines (chucked) through the positions shown in dashed lines (dechucked) as shown in FIG. 6.

Figure 7:
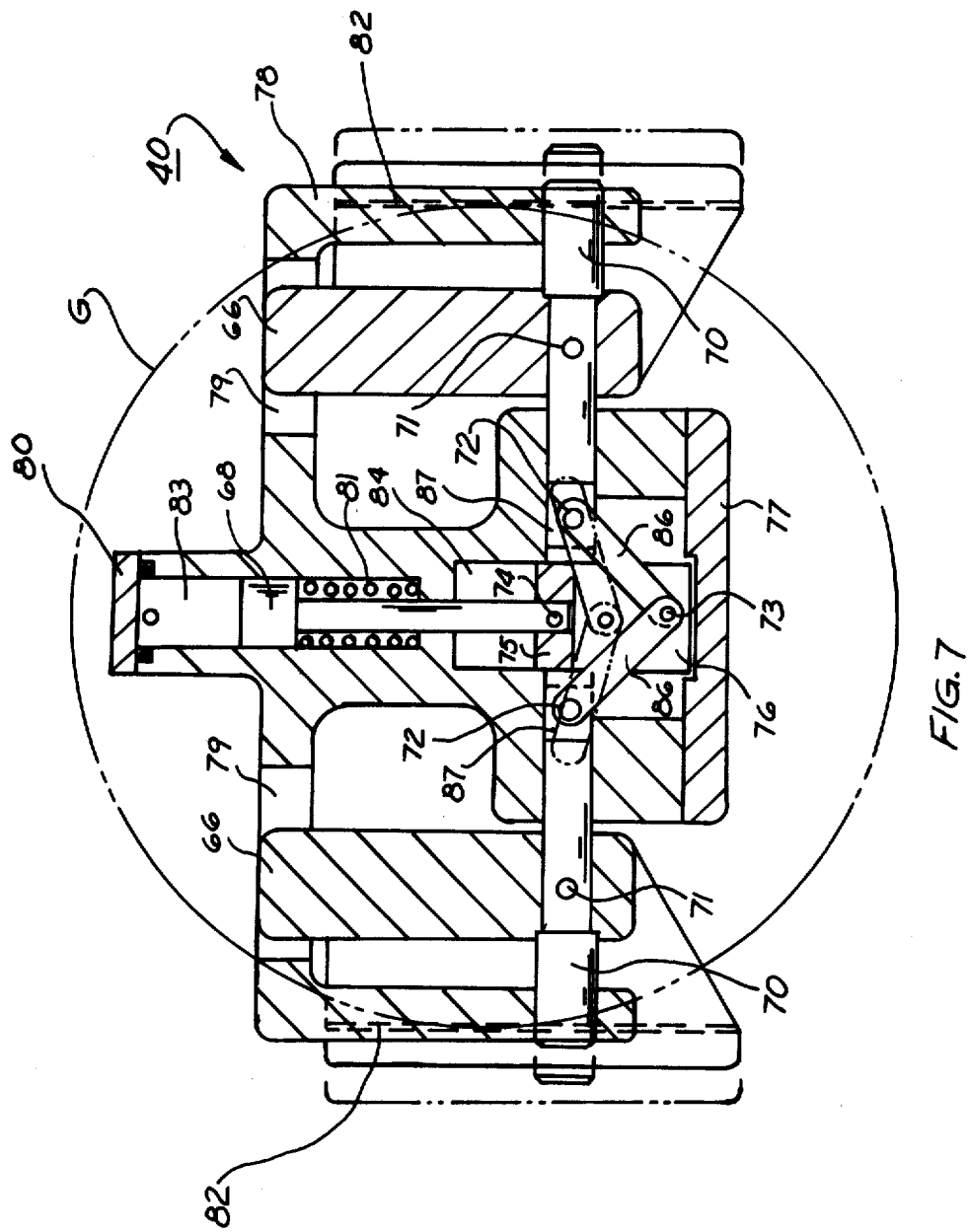
FIG. 7 is a longitudinal sectional view of one of the transfer device jaws for transferring gears.

Referring to FIG. 7 showing the gear jaw actuating mechanism 40, the mechanism comprises a housing 78 which has two upwardly opening slots 70 cut therein to allow for sliding of gear jaws toward and away from one another. A chamber 83 is provided in the gear jaw housing 78 with a piston 68 and spring 81 coacting to open and close the jaw members 66. For closing the jaws on a gear, introduction of fluid pressure into chamber 83 causes piston 68 to compress spring 81 while moving in a downward direction. Block 75 which is pinned to piston 68 by pin 74 slides downward in chamber 84. Block 75 has a slot 76 cut therein to allow for movement of links 86. These links 86 are pivotally pinned to block 75 and to plungers 70 respectively by means of pins 73 and 72. Plungers 70 have flats 87 cut thereon to permit pins 72 and links 86 to be assembled more easily. Plungers 70 are fixedly pinned to gear jaws 66 by means of pins 71, as block 75 is moved downward by actuating piston 68, links 86 pivot about pins 72 and 73 thereby causing plungers 70 to move gear jaws from the open position shown in dashed lines to the closed position shown in full lines (FIG. 7). Upon exhaust of fluid pressure from chamber 83, spring returns to its extended position, thereby causing jaws 66 to open. Jaws 66 have gripping sections 82 thereon to firmly hold the gear G. These gripping sections incorporate V-notch surfaces designed to grip the front angle and back angle surfaces of the gear at two points on each jaw to establish the radial and axial positioning of the gear in the jaw mechanism, as will be understood.

Ring gears and pinions are delivered to the just-described transfer device from an incoming magazine and load nest. The incoming magazine, which is a form of "walking beam," is shown in three different views in FIGS. 8, 9 and 10. The incoming magazine 14 extends forward along the side of the machine and to near the front of the machine. The incoming magazine 14 is supported on a relatively large bracket which is mounted to the frame of the machine 10. The bracket 102 is designed such that it will support two movable members, namely a bracket 104 which moves generally in a vertical direction, and second rather large bracket 106 which moves horizontally with respect to bracket 104.

Bracket 104 is slidably mounted on rails 108 which are located at both extremities of the load magazine. Rails 108 are secured into bracket 102 and rigidly fixed therein. The vertical motion of bracket 104 is facilitated by double acting piston cylinder arrangement 110 which is fastened to bracket 102 at the bottom of the piston cylinder arrangement and fastened to bracket 104 by extension 112. Upon actuation of the piston cylinder arrangement 110, the piston rod pushes against extension 112, thus causing bracket 104 to move in an upward direction. When bracket 104 reaches its maximum upward position, bracket 106 is actuated by another piston cylinder arrangement 114 acting between brackets 104 and 106 therefor moving the latter from right to left, or from left to right, depending upon the desired sequencing. Bracket 106 includes extensions 116 which are slidably journaled on shafts 118 for movement in a horizontal direction. Shafts 118 are in turn supported by extensions 126 and 128 of bracket 104. The extensions 126 and 128 project outwardly from bracket 104 at four horizontally spaced positions, as can be seen in FIGS. 8 and 10.

Attached to the bottom of bracket 106 is a guide roller 120 for preventing rotation of bracket 106 and for acting as a guide during horizontal movement. A plate (FIG. 8) which is integral with bracket 104, has located on its top surface a guide slot 124 which acts as a guide for roller 120 during horizontal movement of bracket 106.

Bracket 106 is used for advancing the gear members of the gear sets being carried by the magazine. In addition to the advancing of ring gears, the pinions are also advanced and maintained in a predetermined relationship to each respective gear. This movement is accomplished by mechanism including a long bar 130 which runs the entire length of load magazine. Spaced along the entire length of bar 130 are pairs of finger-like projections 132 extending therefrom, each pair corresponding to a respective gear slot on bracket 106. Bar 130 is pivotally mounted to shafts 118 and is moved in a horizontal direction with bracket 106 in response to movement of piston cylinder means 114.

At the top of stationary bracket 102 are a pair of rails 142 with spaced slots 141 for receiving ring gears which are loaded into the magazine. Upon upward movement of bracket 104 and bracket 106, the bar 130 with its corresponding fingers 132 also moves in an upward direction. This upward movement raises the gears and pinions sufficiently high to permit them to be advanced one slot. To hold ring gears during advancement, a plurality of slots 144 are provided in bracket 106. Each slot 144 corresponds with a respective pair of slots 141, and as bracket 106 raises, the outside diameter of each ring gear engages one of the slots 144 in bracket 106, and the gears are held vertically during advancement of bracket 106.

Fingers 132 correspond with slots 141 and 144 to keep each gear and pinion pair in a particular relationship until they are delivered to the load nest. Before being lifted by fingers 132, the pinions are supported by rails 145.

As can be seen in FIG. 9, after advance of pinions the return movement of bar 130 (from a left to a right direction in FIG. 8) will interfere with the shanks of pinions held by rails 145. For this reason, it is necessary to move fingers 132 to a position wherein upon return movement, they will clear the shanks of the pinions. To provide a mechanism for moving bar 130 and its corresponding fingers 132 to such a clearing position, the downward motion of bracket 104 is utilized in a rather simple kinematic mechanism. The mechanism comprises a bellcrank-like structure formed by two rigid arms 146 and 148 which are secured to bar 130, for pivotal motion about shaft 118. To the lower extremity of arm 148 is fixed a guide rod 150 which also passes through two appropriately shaped slots 152 formed in two upright flanges 153, the latter being secured to stationary bracket 102. Upon a downward motion of bracket 104, guide rod 150 follows the slots 152, thereby causing a counterclockwise motion of bar 130 about shafts 118 (FIG. 9). This moves fingers 132 downward and to the left, permitting fingers 132 to clear the pinion shanks upon the horizontal return motion of the walking-beam mechanism.

To insure proper loading of the pinions prior to advancement, a means is provided for centering the pinion shanks in the magazine, This means includes a long bar 156 which extends the entire length of the magazine and has scallops cut therein corresponding with pinion shank diameters. Bar 156 is supported on arms which are pivoted at 158. Appropriate mechanism (not shown) moves bar 156 into and out of abutting relationship with the pinion shanks in timed relation to the sequence of walking beam operation as just described.

Figure 11:
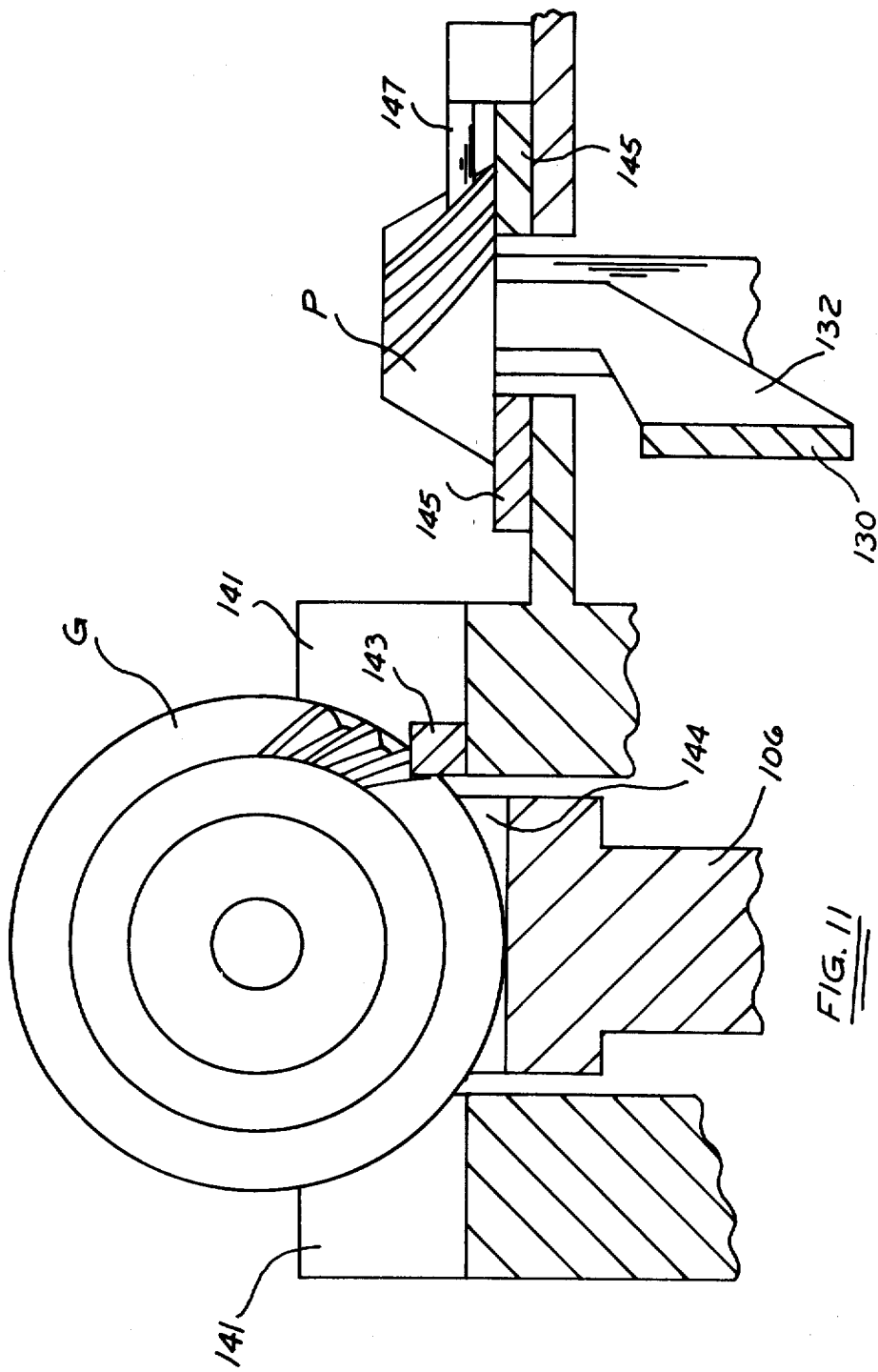
FIG. 11 is an enlarged partial view (similar to FIG. 9) of a ring gear and pinion at rest in the incoming magazine.
Figure 15:
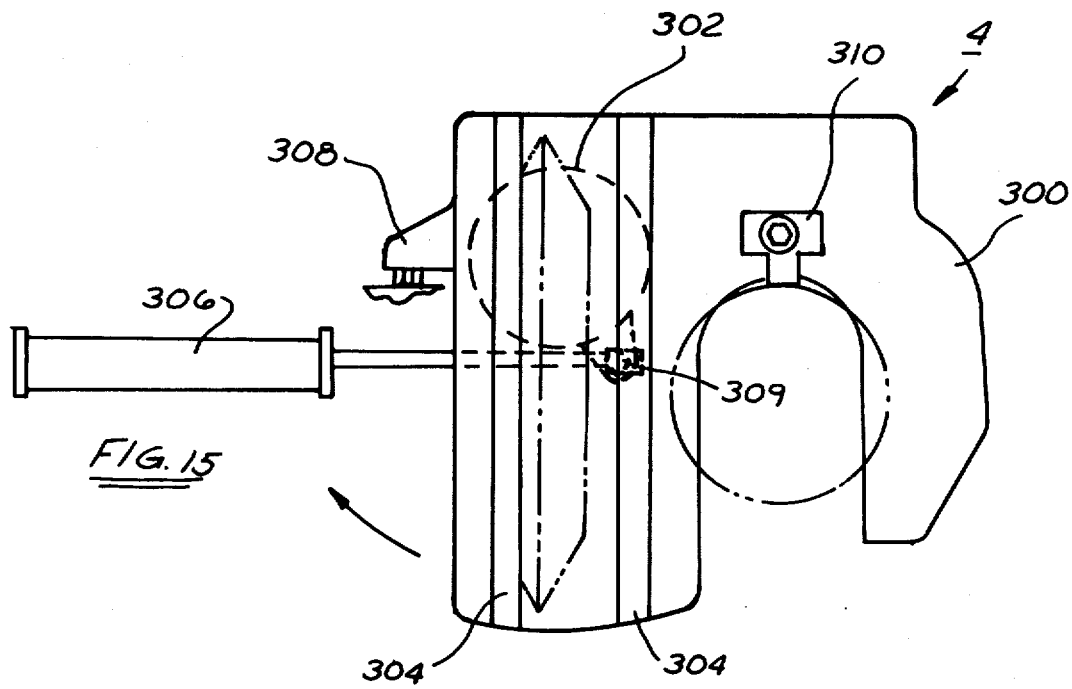
FIGS. 15 and 16 are enlarged details of the reject turntable in top plan and elevation, respectively.
Figure 16:
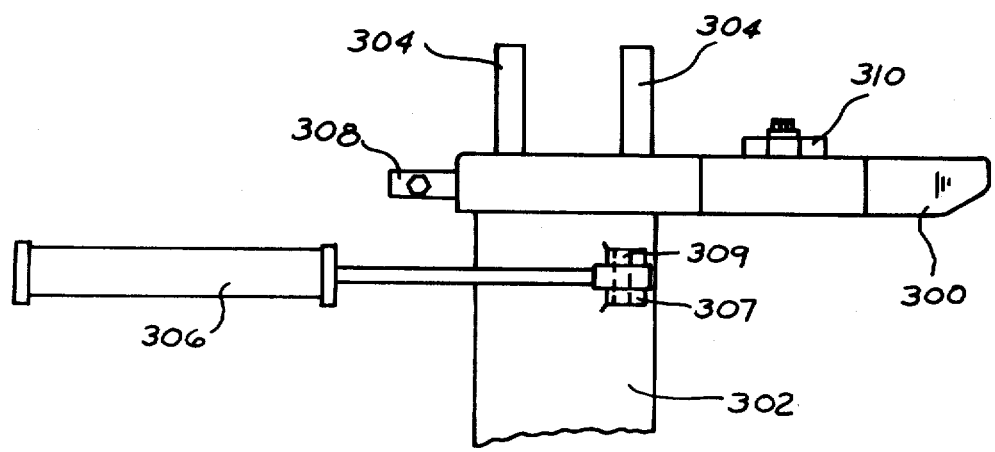

As shown in FIG. 11, positioning pins 143 and 147 are fixedly mounted in slots 141 and on rails 145 respectively of the incoming magazine 14 for establishing and maintaining the angular positioning of the tooth slots of the gears and the pinions as they are placed in and advanced through the magazine. A pair of such pins is provided at each position of the gear pair in the magazine. Each gear pair reaches the work station in the established tooth and slot relationship for meshing.

The loading nest 16 which is the subject of FIGS. 12 and 13 includes a housing 200 which has located therein supports and bores for supporting horizontal, transversely extending rods 218, 219, 220 and 221. The gear carrier 202 within the load nest is supported for sliding on rods 218 and 219. This carrier has openings 214 cut therein for accepting a gear G from the incoming magazine 14. Rod 218 is supported at one end by a support member 216. A pinion carrier member 204 is supported by sliding on rods 220 and 221. This member 204 has a rectangular hole 222 cut therein to accept a pinion P from incoming magazine 14. A hydraulic motor 232 is mounted on the front of the housing 200 near the right end. At the opposite end of the front of the housing 200, idler sprocket 226 is mounted for free rotation. An endless sprocket chain 230 is entrained about the motor sprocket 228 and the idler sprocket 226. Interconnecting chain 230 and carrier 204 is a non-rotatable sprocket-like segment 224 which is fixed to pinion carrier 204.

Screw and nut arrangement 234 is used for adjusting the length of travel of the pinion carrier 204. The means for adjustment allows the load nest to (1) accept a gear and pinion from the front end of the incoming magazine 14 at the gear-to-pinion spacing prevailing there, and (2) upon leftward movement, to move the pinion P transversely relative to the gear by an adjustable amount sufficient to dispose the gear G and pinion P in the relative spacing required for acceptance by the transfer device.

The gear carrier 202 and the pinion carrier 204 are shown in position for the transfer mechanism 18 to lower and withdraw a gear G and pinion P from the loading nest and to lift and transfer each to the work station W (FIG. 1). After the transfer hydraulic motor 232 is actuated to drive chain 230 moving pinion carrier 204 to the right. As pinion carrier 204 moves to the right, abutment 210 drives abutment 212 which is fixed to gear carrier 202 to the right also. Thus the pinion carrier 204 pulls the gear carrier 202 to the correct loading position, i.e., to receive a new gear and pinion from incoming magazine 14. The limit of travel to the right for the pinion carrier 204 may be determined by the rotation of the hydraulic motor 232 or by an abutment screw similar to 234. Adjusting block 211 and screw 206 are used to change the relationship of the abutments 210, 208 and 212, thereby controlling the distance of gear G travel and enabling a wider range of gear sets to be handled without high costs of retooling.

The unloading turntable, the unloading nest and the reject chute will now be discussed with reference to FIGS. 14–18.

The turntable 300 is integral with shaft 302 which is mounted for rotation about a vertical axis. The table 300 has a laterally opening slot 301 which is designed to accept a pinion when it is placed therein by the transfer mechanism 18. On the upper surface of table 300 vertical guides 304 are fixed for guiding gears as they are placed on the table 300 by transfer mechanism 18. Adjusting block 310 is used for adjusting the position of the pinion as it is set in opening 301. Beneath the table 300 and fixed to shaft 302 a yoke arrangement 307 supports a pin 309. Upon actuating piston 306 during a gear set rejecting operation, the rod withdraws to the left. This causes rotation of the table 300 in a clockwise direction. Once the table 300 is in this clockwise position, the gear and pinion are ready to be removed and transferred to the reject chute 312, FIG. 17. (Abutment 308 is used when table 300 is reset to its normal unload position to orient the table in its proper position.)

As the reject table 300 is facing the reject chute 312, the rejected pinion P and gear G are ready for removal. Removal of the gear G is facilitated by an arm 320 supported by sliding member 318. Attached to arm 320 at its end, is an overriding pawl 324 which engages the bore of the gear G, and pulls it to the left onto the reject chute 312. Similarly arm 322 is attached to member 318 and has affixed at its end a pawl 326 pivoted on pin 327. The pawl 326 also is of the overriding type and pulls the pinion P off the turntable 300 and onto the reject chute 312. Slidable member 318 is mounted for sliding on shaft 328. This shaft 328 is supported at each end by stationary brackets 314 and 316. Attached to sliding member 318 is link 332 which is slidable along shaft 330 and fitted at one end to piston rod 341. (Member 318 is keyed to shaft 328 for added support against arm rotation.) Piston 340 is affixed at one end by a stationary support 342. Also, adjusting screw 344 adjusts chute 312 to the desired angle. Upon actuation of piston 340 rod 341 extends forward as shown. Upon actuation in a rearward direction, the rod 341 withdraws to the left. Link 332 pulls slidable member 318 along shaft 328. Pawls 324 and 326 engage the gear bore and the pinion head respectively. This motion pulls the gear set off reject table 300 and onto chute 312 which is adapted to enable a gear set to slide thereon. The reject chute is partitioned lengthwise into two suitably proportioned compartments separating gears from pinions and permitting them to be moved by gravity and maintained in paired relationship.

If, instead, the gear and pinion of a set are acceptable, and are worked upon at the work station W, and then removed by the transfer mechanism and set on turntable 300, they are ready to be deposited to the unload nest 22. As transfer bracket (see FIG. 4) is shifted to the left, arm 368 which is fixed thereto has provided therein overriding pawls (similar to the unload chute) which push the set onto the unload nest, i.e., the leftward motion of bracket 21 is utilized to push the set onto the unload nest 22. As the pinion is being pushed by arm 368 it slides along rails 360 (FIG. 14). As the pinion reaches the end of the rails 360, it is deposited on pivoted fork 350 which is fixed for rotation about shaft 352. The receiving slot 359 being offset from the shaft 352 causes the fork to turn in a counterclockwise direction to the position shown in phantom. As the pinion is being pushed into the slot 359, pusher arm 368 pushes the gear from turntable 300 over a ramp block (not shown) in the unload nest which is provided to raise the gear over support rails 142 of unload magazine 22, thereby depositing the gear in the unload magazine. (See FIG. 9: the unload magazine is similar in construction to the load magazine.) Upon completion of the unloading, the pivoted fork 350 is reset using piston 356, rod 354 and pivot pin 353.

Figure 19:
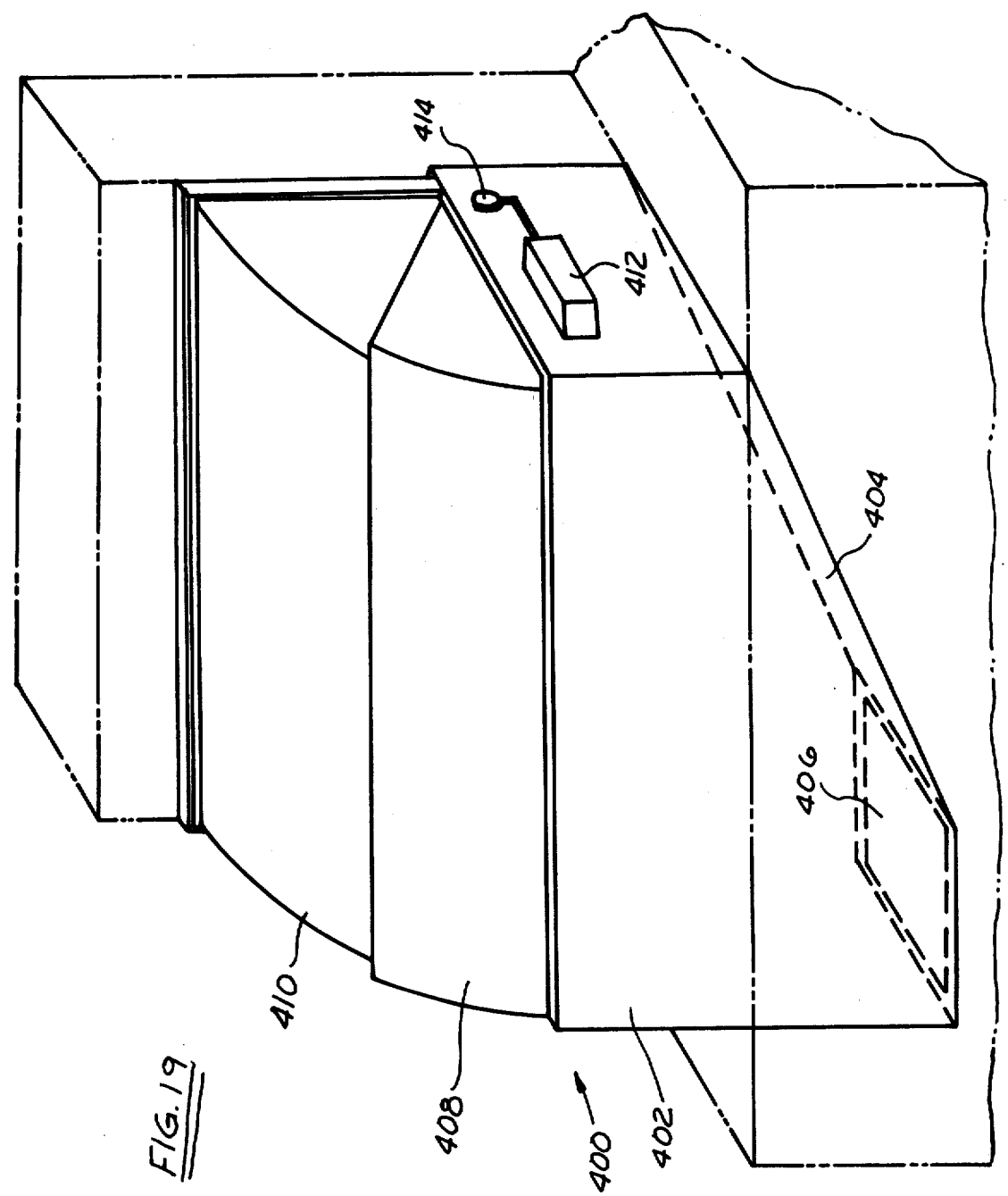
FIG. 19 is a partial perspective view of telescoping lapping chamber cover on the front of the machine in its closed position.

With reference to FIGS. 19, 20 and 21 the operation of the automatic lapping chamber will now be explained. The lapping chamber 400 is partially cylindrical in shape. It comprises three interlocking members which coact with one another during the automatic operation of the machine. These members comprise a first stationary enclosure 402 which is secured to the frame of the machine, and has internal inclined surface 404 provided to facilitate flow of used lapping compound to opening 406 and subsequently to the sump. Two members 408 and 410 are mounted for pivoting about the axis of shaft 414. The pivoting of these two members is effected by a double-acting piston 412 thereby imparting a rotary motion to a pivot shaft. Pivot shaft 414 is mounted for rotation in enclosure 402. Shaft 414 is fixed to movable member 410 by known means (not shown). Movement of member 410 in either a raised or lowered position results in a corresponding movement of member 408. Surface 416 while raising abuts surface 418 thereby causing member 408 to follow the motion of member 410.

FIG. 20 shows the members in their raised position sealing the chamber. FIGS. 21 shows the members in their lowered positions for automatic loading and work handling.

It can be seen that automatic work handling and loading is facilitated by the lowering of the cover, since the work station area is unobstructed. Also, the lowering of the movable members provides a virtually "dripface" arrangement so that during loading and transferring of parts, compound of the top of the lapping chamber cannot drip on the vital parts of the loading and transferring mechanism and workholders.

A brief review of the preferred operation of the automatic server is now provided:

The machine operator fills all or as many as desired of the positions of the incoming magazine with gear pairs to be worked on at the work station. The walking beam action of the bracket 106 successively moves the gear pairs forwardly along the right side of the machine. Each gear pair is finally walked into the load nest where it is transferred toward the work station and spaced to be accepted by the right-most head of the transfer device, which lowers, removes one gear pair from the work station with its left-most head and accepts the gear pair from the load nest with its rightmost head, translates transversely leftwardly and deposits the left-most gear pair on the turntable and installs the right-most gear pair at the work station where the pair is initially tested for proper mounting and for defects. If the gear pair deposited at the turntable is being rejected, the turntable passes that gear pair to the reject chute. If on the other hand that gear pair was found acceptable and was worked upon at the work station, the turntable stores that gear pair until the next motion cycle of the transfer device when the leftward translation of said transfer device will serve to push the stored pair to the unload nest. From the unload nest it is picked up by the walking beam of the unload magazine and walked back by steps in the unload magazine. The load and unload nests function as interfacing devices between the incoming and outgoing magazines respectively and the transfer mechanism 18 to permit adjustment of spacing and to allow the walking beams to begin a movement before the transfer mechanism has accepted or deposited a gear pair. The machine operator periodically (before the capacity of the magazine has been exceeded) removes lapped pairs of gears from the slots of the of the unload magazine and marks or wires each pair together. The operator also periodically removes pairs of rejected gears from the reject chute and notes for each from the shift register display the reason why that pair was rejected so remedial measures may be undertaken.

There are many reasons for rejecting a gear pair, i.e., for preventing their running together during a normal lapping operation. For instance, (1) if either the gear or pinion is not properly seated or aligned in its respective spindle, perhaps due to improper bore or shank size, or due to an accumulation of compound or chips on the seat; or (2) if the pair does not move into proper axial position when in tight mesh, due to over or under-sized teeth, or due perhaps to the fact that one of the pair was never finish cut; or (3) if, when in rolling engagement, improperly large vibrations are noted due to the presence of a nick, burr, or a mis-shaped tooth; in the event of the existence of any one of the above conditions, the continuance of normal machine routine, including lapping cycles, would result in damage to the gear pair and/or to the machine. Therefore, a check is made to discover such improper operating conditions just after each pair has been loaded onto the machine spindles and before lapping is initiated. If any such conditions are found to exist, appropriate signals are sent to the logic circuits controlling machine operations and the normal sequence is changed: The logic circuitry bypasses the normal lapping cycles, immediately initiating another unload-load operation, and the pair causing the improper condition is rejected as described above.

Details of the reject system are schematically illustrated in FIG. 22. A reject display, designated generally at 426 includes a panel having a matrix of blocks each of which can be selectively lighted. Each pair of gears in the reject chute is designated by one of the columns 1 through 6, while the reasons for rejection are indicated by the rows A through E. When the first gear pair is moved into the reject chute in the manner described above, the reason for its rejection is simultaneously indicated by the lighting of one or more blocks A–E in column 1. The reasons for the next rejected pair appear by the lighting of selective rows of blocks in column 2, while the reasons for the rejection of the third pair appear in column 3, etc.

Whenever the operator removes a pair of gears from the reject chute, he first notes the reasons for rejection, and as the pair is removed a register shift button 428 activates a shift register controlling the lights on panel 426, moving all indications one column to the right, in a well known manner. In this way, the reasons for rejection appearing under column 1 of the display panel always relate to the next gear pair to be removed from the reject chute.

To check for proper spindle seating, air under pressure is supplied to channel 430 in pinion spindle 30. If the back face of pinion P is not properly seated against the front face of its spindle 30, channel 430 is not properly blocked, and back pressure normally experienced in channel 430 is lost. This drop in pressure is detected by pressure switch 432 which provides an appropriate signal of this failure to the reject display 426 and to the machine's control logic circuitry 434 to initiate the rejection sequence.

A similar air pressure checking system comprises air channel 436 and pressure switch 438 to provide an indication of an undersized pinion shaft. That is, if the pinion shaft is too small to be properly gripped by the chucking mechanism of pinion spindle 30, channel 436 is not properly blocked and the resulting loss of pressure in the channel causes operation of pressure switch 438. Similar seating and chucking checks (not shown) are provided for the gear spindle to monitor the proper seating and gripping of gear G.

If the pinion and gear are properly seated and gripped, the control logic circuits next cause the gear head 32 to move forward (to the left in FIG. 22) to bring the gear pair into tight mesh. If for some reason the gear pair are not properly matched, that is, if the teeth on one member of the gear pair are larger or smaller than the mating teeth on the other, gear head 32 will move axially less than or more than a predetermined distance to achieve tight mesh. A three position switch 440 monitors for such improper axial movement. If, following axial movement of gear head 32 to bring the gear pair into tight mesh, switch lever 442, which is biased to follow the movements of head 32, remains in position 442′ or is moved to position 442″, switch 440 sends a control signal to the reject display 426 and to the control logic circuits 434 to initiate the rejection of the gear pair.

In the event that the position of switch lever 442 indicates that meshing is proper, the control logic circuits proceed to establish proper running backlash for the gear pair (by withdrawing gear spindle a predetermined few thousandths of an inch) and the pair is then driven at low speed in rolling engagement. A transducer 444, fixed to the pinion spindle 30, generates electrical signals corresponding to the vibrations set up in the spindle in response to the repetitive tooth-to-tooth running contact of the gear pair. A nick, burr, or mishshaped tooth will cause a definite increase in amplitude of the normal vibration pattern generally produced by the interaction of successive teeth of a pair of gears running at constant speed in rolling engagement. The signals generated by transducer 444 are amplified by amplifiers 446 and 448 and fed to a peak-passing limiter circuit or other appropriate signal level detector 450 which is set to pass only signals of greater-than-normal amplitude. In order to avoid rejection of a pair due to reception of some non-repetitive machine vibration set up in spindle 30, the output of detector 450 is fed to a counter 452. In this way, only repetitive larger-than-normal signals are used to indicate rejectable pairs, and for this purpose a counter switch 454 may be selectively set to a predetermined number of repetitive signals required to provide a reject indication. As soon as the number of signals set on switch 454 are recorded by counter 452, an appropriate signal is sent to reject display 426 and control logic circuitry 434 to initiate reject sequences.

In the event the reject display shift register becomes filled, a light 456, bell, or other signal is engaged to call attention to the operator that the reject chute requires emptying.

The preferred embodiment of the automatic server illustrated and described herein has been selected to facilitate disclosure and understanding, and it is only one of many possible forms for the invention herein. Therefore, it will be appreciated that the invention can be modified for adaptation to different machines, to different rejection specifications, etc. without departing from the spirit and scope as expressed and implied herein.

What is claimed is:

1. For a machine for running together a pair of bevel or hypoid gears for lapping, testing or the like, an automatic server comprising:

first conveyor means for receiving and forwarding workpieces to be installed at a work station of said machine;

second conveyor means for accepting and tending gears in pairs as they have been removed from the work station;

transfer means for moving the workpieces through the work station between the first and second conveyor means and for installing and removing a pair of workpieces in and from respective workholders at said work station;

sensing means for sensing, subsequent to operation of said installing means, at least one of the following conditions:

a. improper seating and gripping of one of said workpieces by the workholders, or b. improper axial position of one of said two workpieces when said workpieces are in tight meshing engagement at said work station, or c. improper vibration occurring when said two workpieces are in rolling engagement.

2. The automatic server of claim 1 further comprising program control means automatically, repeatedly interspersing operation of said first conveyor means, said transfer means and said second conveyor means to serially install each gear pair forwarded by the first conveyor means at the work station then remove that gear pair and deposit that gear pair with the second conveyor means.

3. The automatic server of claim 1 wherein said transfer means includes two, transversely spaced heads, each structured to grasp and let loose a gear pair, said two heads being so spaced relative to the first and second conveyor means that at one disposition of the transfer means, one head is located to accept a gear pair from the first conveyor means and the other head is disposed adjacent the work station for removing a gear pair from the work station, and so that, at another disposition of the transfer means transversely spaced from the first disposition, said other head is disposed to deposit a gear pair removed from the work station upon the second conveyor means, and said one head is located adjacent the work station for installing a gear pair which has been brought from the first conveyor means by said one head.

4. The automatic server of claim 2 wherein said sensing means is operatively connected to said program control means for initiating operation of the transfer device to remove a gear pair from the work station and simultaneously replace that gear pair with a succeeding gear pair from the first conveyor means and deposit the removed gear pair upon the second conveyor means.

5. The automatic server of claim 4 wherein the second conveyor includes:

an outgoing magazine for accepting gear pairs which have been worked upon at the work station;

a reject chute for accepting gear pairs which have been removed from the work station due to sensation of at least one of said conditions (a) through (c);

turntable means normally disposed to accept gear pairs from the transfer device and feed them toward the outgoing magazine unless the gear pair deposited upon the turntable by the transfer device is removed from the work station due to the sensation of at least one of the conditions (a) through (c), in which case the turntable is operable to become temporarily disposed to feed that gear pair to the reject chute; and said turntable being operatively connected to said program control means for automatic control of the disposition thereof.

6. The automatic server of claim 5 further including display register means for serially, visually indicating the reason(s) for rejection of each gear pair forwarded to the reject chute.

7. The automatic server of claim 6 wherein said display register means includes shift means operable upon at least one of deposit of another gear pair in the reject chute and removal of a gear pair from the reject chute to displace, add and delete visual indications of reasons for rejection of the gear pairs remaining in the reject chute.

8. The automatic server of claim 5 wherein the second conveyor further includes an unload nest having means for accepting a gear pair from the turntable.

9. The automatic server of claim 8 wherein the transfer means includes adjustable pusher arms for moving a gear pair from said turntable into said unload nest.

10. The automatic server of claim 9 wherein said unload next has movable means cooperating with said adjustable pusher arms for disposing the gear pair for acceptance by the outgoing magazine.

11. The automatic server of claim 10 wherein the outgoing magazine includes walking beam means intermittently operable to advance gear pairs accepted thereby one step therein; said walking beam means having a portion disposed to walk pairs of gears from the unload nest into the outgoing magazine.

12. The automatic server of claim 11 wherein the relative disposition of the gears of each gear pair installed at the work station differs from the relative disposition of the gears of each gear pair in the outgoing magazine and said unload nest movable means and said pusher arm adjustable means cooperate to adjust the relative dispositions of each gear pair to that relative disposition in the outgoing magazine.

13. The automatic server of claim 2 wherein the second conveyor includes:

an outgoing magazine for accepting gear pairs which have been worked upon at the work station; and an unload next interposed between the transfer device and the outgoing magazine for accepting gear pairs from the former and for cooperating with adjustable pusher arms operable as a part of said transfer device to dispose said gear pairs for acceptance by said outgoing magazine; and said outgoing magazine includes walking beam means intermittently operable to advance gear pairs accepted thereby by one step therein; said walking beam means having a portion disposed to walk pairs of gears from the unload nest into the outgoing magazine.

14. The automatic server of claim 13 wherein the relative disposition of the gears of each gear pair installed at the work station differs from the relative disposition of the gears of each gear pair in the outgoing magazine and said unload nest includes movable means cooperating with said pusher arms for adjusting the relative dispositions of each gear pair received thereby for transferral to the outgoing magazine.

15. The automatic server of claim 2 wherein the first conveyor includes:

an incoming magazine;

a load nest interposed between the incoming magazine and the transfer device for accepting gear pairs from the former and disposing them for acceptance by the latter;

the incoming magazine including walking beam means intermittently operable to advance gear pairs accepted thereby by one step therein; said walking beam means having a portion disposed to walk pairs of gears from the incoming magazine into the load nest.

16. The automatic server of claim 15 wherein the relative disposition of the gears of each gear pair installed at the work station differs from the relative disposition of the gears of each gear pair in the incoming magazine and said load nest includes means for adjusting the relative dispositions of each gear pair received thereby while transferring that gear pair from the incoming magazine to the transfer device.

17. The automatic loader of claim 1 wherein the transfer device is configured to grasp a pinion disposed with its longitudinal axis vertical and a bevel or hypoid gear with its longitudinal axis horizontal.

18. The automatic server of claim 1 wherein said first conveyor means includes means for sensing relative angular positioning of each gear with respect to its teeth so that when pairs of gears are installed at the work station and brought together they will dependably mesh rather than clash.

19. The automatic server of claim 2 further comprising cover means movable to and from a position enclosing the workholders at said work station and responsive to said program control means, said cover means moving to said enclosed position only when the workpieces are installed in said workholders.

20. The automatic server of claim 19 wherein said cover means comprises a plurality of telescoping members each of which moves inside the next respective one thereof.

21. The automatic server of claim 20 wherein said telescoping members have overlapping edge means which interconnect when said cover means is moved to said work station enclosing station.

22. For a machine for running gear pairs together in mesh at a work station for lapping or testing, each gear pair consisting of a bevel or hypoid gear and a corresponding pinion, the bevel or hypoid gear of the pair being mounted for rotation on a horizontal spindle and the corresponding pinion being mounted for rotation on a vertical spindle, and the spindle mounting the bevel or hypoid gear being axially movable to assist in mounting and demounting gears thereon and to bring gears mounted thereon into and out of mesh with corresponding pinions mounted on the other spindle, an automatic server comprising:

a transfer device mounted for movement with respect to the machine for installing gear pairs at the work station and for removing gear pairs from the work station; the transfer device having two, spaced heads, each structured to grasp and let loose a gear pair, said two heads being so spaced that, at one disposition of the transfer device, one head is disposed to accept a gear pair to be installed at the work station and the other head is disposed adjacent the work station for removing a gear pair from the work station, and so that, at another disposition of the transfer device spaced from the first disposition, said other head is disposed to deposit a gear pair removed from the work station and said one head is located adjacent the work station for installing the gear pair accepted when the transfer device was last in the first disposition thereof.

23. The automatic loader of claim 22 wherein each head of the transfer device is configured to grasp a pinion disposed with its longitudinal axis vertical and a bevel or hypoid gear with its longitudinal axis horizontal.

24. The automatic server of claim 23 wherein when each head is disposed adjacent the work station, with the transfer device in one of said dispositions thereof, the head is aligned with the spindle for the bevel or hypoid gear so that spindle may be simply advanced and retracted axially to respectively mount and demount a bevel or hypoid gear respectively being brought by and removed by the head.

25. For a machine for running gear pairs together in mesh at a work station for lapping or testing, each gear pair consisting of a bevel or hypoid gear and a corresponding pinion, the bevel or hypoid gear of the pair being mounted for rotation on a horizontal spindle and the corresponding pinion being mounted for rotation on a vertical spindle, and the spindle mounting the bevel or hypoid gear being axially movable to assist in mounting and demounting gears thereon and to bring gears mounted thereon into and out of mesh with corresponding pinions mounted on the other spindle, an automatic server comprising:

a transfer device mounted for movement with respect to the machine for installing gear pairs at the work station and for removing gear pairs from the work station; the transfer device having at least one head structured to grasp and let loose a gear pair, said at least one head being configured so that when it is disposed adjacent the work station it is aligned with the spindle for the bevel or hypoid gear so that spindle may be simply advanced and retracted axially to respectively mount and demount a bevel or hypoid gear respectively being brought by and removed by the head.

* * * * *